United States Patent
Caster

[15] 3,685,795
[45] Aug. 22, 1972

[54] FLUID FLOW VALVE
[72] Inventor: Glenn Caster, Chicago, Ill.
[73] Assignee: Baxter Laboratories, Inc., Morton Grove, Ill.
[22] Filed: July 6, 1970
[21] Appl. No.: 52,493

[52] U.S. Cl. .............................251/342, 251/335 B
[51] Int. Cl. ..........................................F16k 31/58
[58] Field of Search ..........251/342, 335 B; 137/318; 128/214 D

[56] References Cited

UNITED STATES PATENTS

| | | |
|---|---|---|
| 3,171,412 | 3/1965 | Braun.....................128/214 D |
| 3,529,599 | 9/1970 | Folkman et al.........128/214 D |
| 3,495,615 | 2/1970 | Ehrens et al...............137/318 |
| 2,955,595 | 10/1960 | Semple..................137/318 X |
| 2,661,019 | 12/1953 | Snyder et al. ........251/342 UX |
| 2,769,608 | 11/1956 | Reinig....................251/342 X |
| 2,964,292 | 12/1960 | Noir ...........................251/342 |
| 3,030,064 | 4/1962 | Taylor....................251/342 X |
| 3,509,905 | 5/1970 | Mullins.......................137/318 |
| 3,530,928 | 9/1970 | Swinney.................251/342 X |
| 3,547,401 | 12/1970 | Beall et al..............251/342 X |
| 3,554,217 | 1/1971 | Ehrens et al...............137/318 |

Primary Examiner—Samuel Scott
Attorney—W. Garrettson Ellis and Barry L. Clark

[57] ABSTRACT

A fluid flow valve is disclosed which comprises a tubular member which carries a pierceable sealing diaphragm mounted therein to prevent fluid flow. A pointed piercing spike is mounted coaxially with the tubular member and is movable to pierce the diaphragm with its point. A section of the spike is proportioned to sealingly occlude the bore of the tubular member after piercing of the diaphragm to prevent fluid flow through the tubular member, but to permit fluid flow through the tubing upon removal of the proportioned section from the bore of the tubular member.

2 Claims, 5 Drawing Figures

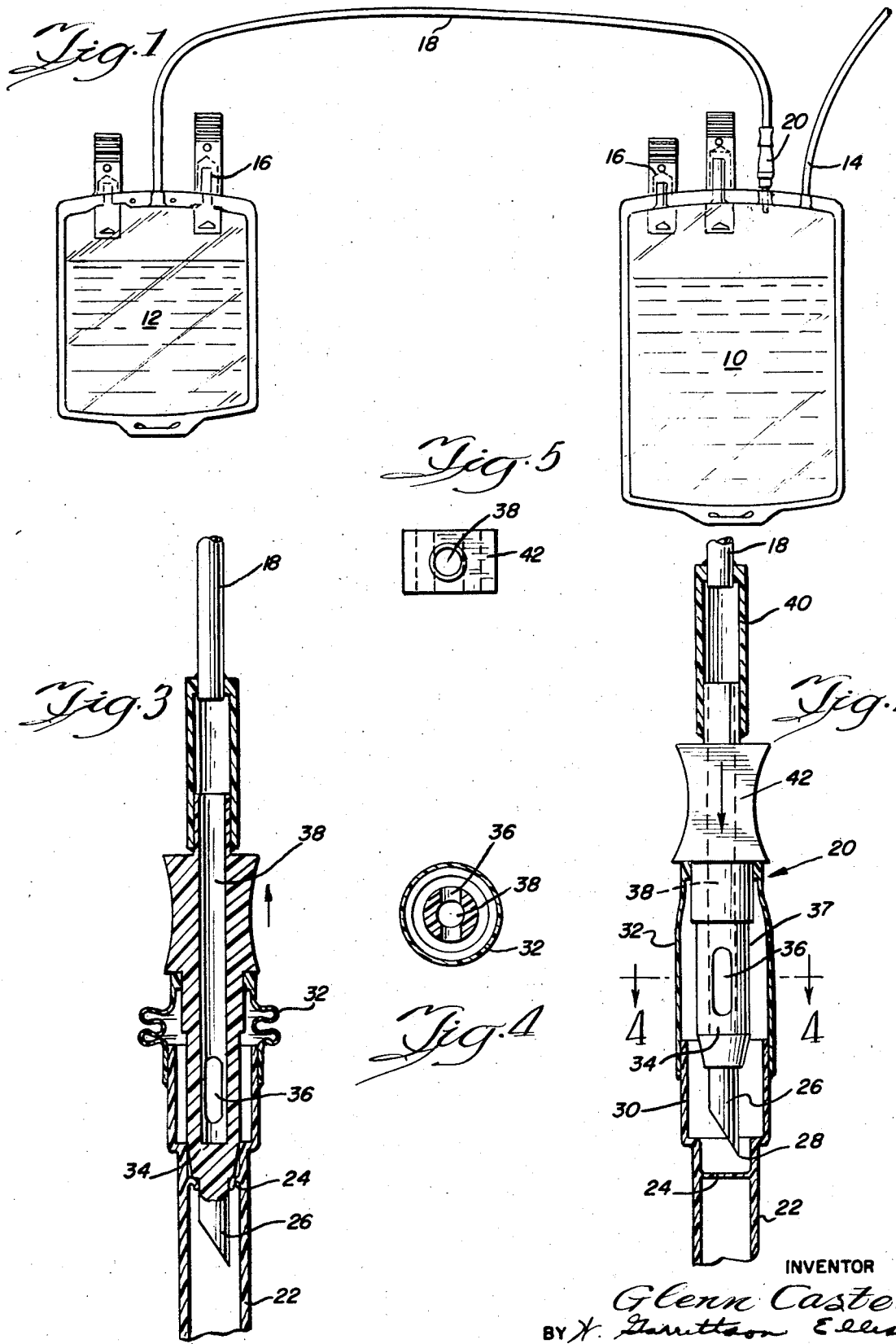

3,685,795

FLUID FLOW VALVE

BACKGROUND OF THE INVENTION

This application relates to a fluid flow valve which is specifically contemplated for use with flexible blood bags and the like, but which also can be used for the control of fluid flow in any conduit.

As indicated in Bellamy U.S. Pat. No. 3,110,308, Bellamy et al. U.S. Pat. No. 3,127,892, and Alder et al. U.S. Pat. No. 3,205,889, it is desirable to provide a sterile means for blocking the flow of fluid into and out of flexible blood bags until the desired time of opening arrives. In the past, this has been done by the use of a flexible bead or the like to obstruct the tubing leading into the blood bag. The same function has likewise been accomplished through the use of a sealing diaphragm in the tubing which is pierced by a cannula when it is desired to initiate flow through the tubing.

A disadvantage of the diaphragm and the cannula opening technique lies in the fact that, once opened, the diaphragm cannot be resealed. Thus, an additional clamp or other valving means must be used if it is desired to once again restrict flow through the conduit. On the other hand, a bead or the like blocking flow in the tubing requires time consuming manipulation in order to remove or reinsert it, and thus is inconvenient to use.

Another commercial valving technique which is currently used with blood bags consists of a bellows-like tubing, the inner convolutions of which can be compressed against a fixed post extending upwardly within the tubing to provide a fluid-tight seal. Alternatively, when the bellows-like tubing is extended, fluid flow is permitted. Thus, this particular valve provides opening and closing as desired in a sterile manner. However, when blood bags utilizing this valve are centrifuged with the valve in the closed position, it is possible that the high centrifugal force encountered therein can cause the valve to "pop" open, with obvious undesirable results.

Multiple, connected blood bags are generally used by filling a first bag with freshly collected blood, while the tubular connection between the first and remaining bags is closed to prevent fluid flow. The bag is then centrifuged with the connection still closed to separate blood cells from plasma, and then the connection is opened to permit the expressing of one or more of the blood components to the remaining multiple bags.

The valve of this invention is particularly suited for use in this system since the valve, prior to initial opening, is highly reliable against accidental opening during centrifugation. Notwithstanding, the valve has the easy, sterile, opening and closing capability of other valves which are less likely to remain closed during the centrifugation step.

DESCRIPTION OF THE INVENTION

In accordance with this invention, a fluid flow valve is disclosed which comprises a tubular member which carries a pierceable sealing diaphragm mounted across the member to prevent fluid flow therethrough. A pointed piercing spike is mounted coaxially with the tubular member and spaced from the diaphragm. The spike is movable to pierce the diaphragm with its point, and a section of the spike is proportioned to sealingly occlude the bore of the tubular member to prevent fluid flow after piercing of the diaphragm, but to permit fluid flow through the tubular member upon removal of the proportioned section of the spike from the bore of the tubular member.

Preferably, the spike is sealingly connected to the tubular member by means of a flexible sleeve, to permit the spike to remain out of sealingly occluding position after piercing said diaphragm without fluid leakage. Also, a portion of the spike which is separated from the point by at least some of the proportioned sealing section of the spike defines a hollow fluid flow tube connected to the exterior of said portion by an aperture. This defines part of a fluid flow path communicating with the bore of the tubular member when the proportioned section of the spike is in nonoccluding position.

In the drawing,

FIG. 1 is a plan view of a multiple blood bag of the type which is presently commercially available on the market.

FIG. 2 is a sectional view of the valve of this invention in the initial closed position prior to rupture of the diaphragm.

FIG. 3 is a sectional view of the valve of this invention after the piercing spike has been advanced to pierce the diaphragm and to occlude the bore of the tubular member.

FIG. 4 is a sectional view taken along line 4—4 of FIG. 2.

FIG. 5 is a plan view of a separate valve assembly of this invention looking down upon the finger gripping portion of the piercing spike.

Referring to the drawings, FIG. 1 shows a multiple bag which comprises blood collection bag 10 and blood component receiving bag 12. Administration tubing 14 connects to bag 10 at one end and typically to an administration needle for blood collection at its other end. Additional ports 16, of conventional design, are included in each of the blood bags for obtaining their contents after collection and processing.

Tubing 18 connects bags 10 and 12. The flow of fluid through tubing 18 is controlled by the valve of this invention 20.

Referring also to FIGS. 2 through 5, enlarged views of valve 20 are shown for purposes of detail. Valve 20 comprises tubular member or tubing 22, which carries a pierceable sealing diaphragm 24 mounted across tubing 22, which communicates with bag 10. Piercing spike 26 has a point 28 for piercing diaphragm 24. Spike 26 is coaxially mounted with tubing 22 and is connected to enlarged end 30 of tubing 22 by flexible sleeve 32. Alternatively, sleeve 32 can connect directly to tubing 22 without using an enlarged end. Spike 26 has a shoulder section 34 which is proportioned to sealingly occlude the bore of tubing 22 to prevent fluid flow after piercing of the diaphragm 24, as shown in FIG. 3. Thereafter, valve 20 can be opened by withdrawing section 34 from the bore of tubing 22 to permit fluid to flow past ruptured diaphragm 24. It can be seen that the valve can then be reclosed and opened as many times as is desired.

The fluid flow path of the open valve connects with the bore of tubing 22 by way of the region within enlarged portion 30 and sleeve 32, and includes aperture 36 which provides access between such region and the interior of the upper portion 37 of spike 26. The upper portion of spike 26 defines a hollow fluid flow bore 38 which, in turn, leads to adaptor 40 to connect with tubing 18, to complete the flow path between bags 10 and 12.

Handle 42 is connected to and provides easy manipulation by hand of spike 26. Enlarged portion 30 or tube 22 can be fairly rigid, to be gripped with the other hand for facilitating the piercing of diaphragm 24 and for opening and closing of the valve as desired by the moving of proportioned section 34 of the spike into and out of occluding relation with tubing 22.

Thus the valve of this invention provides reliable and sterile sealing by means of diaphragm 24 through the blood collection and initial centrifugation steps during the use of bags 10 and 12. Notwithstanding this, the valve is easily opened by puncturing diaphragm 24 and then withdrawing proportioned section 34 out of the bore of tubing 22 to provide an open flow path through the valve. However, the valve can be closed at any time by simply inserting proportioned section 34 into tubing 22 as shown in FIG. 2 for convenient and reliable sealing.

The above disclosure has been offered for illustrative purposes only, and it can be readily seen that many different embodiments and uses of the valve of this invention can be contemplated, and are intended to be included within the scope of this invention.

That which is claimed is:

1. A flexible container having tubing communicating with the interior of said container, there being mounted in said tubing in communication thereto a fluid flow valve which comprises:

a tubular member which carries a pierceable sealing diaphragm mounted across said tubular member to prevent fluid flow therethrough;

a solid pointed piercing spike mounted coaxially with said tubular member and spaced from said diaphragm, said spike being freely and directly movable between first and second positions to pierce said diaphragm with its point in said first position, a section of said spike being proportioned to sealingly occlude the bore of said tubular member in said first position to prevent fluid flow after piercing of said diaphragm, and to permit fluid flow in said second position through said tubular member upon removal of said proportioned section from the bore of said tubular member;

said valve including a flexible sleeve connecting the tubular member to said piercing spike, to permit said spike to remain out of sealingly occluding position without fluid leakage after piercing said diaphragm, and in which a portion of said spike which is separated from said point by at least some of said proportioned section defines a hollow fluid flow bore connected to the exterior of said portion by an aperture, said fluid flow bore also communicating at one end to the tubing of said flexible container to define a fluid flow path communicating with the bore of said tubular member when said proportioned section is in said nonoccluding second position.

2. The apparatus of claim 1 in which said container is connected to a second container by said container tubing which is connected in fluid flow relation to said valve.

* * * * *